United States Patent [19]

Becker et al.

[11] 4,001,840
[45] Jan. 4, 1977

[54] NON-PHOTOGRAPHIC, DIGITAL LASER IMAGE RECORDING

[75] Inventors: Carl H. Becker, Menlo Park; Herman Wong, Los Altos Hills; William J. Kaspari, Portola Valley, all of Calif.

[73] Assignee: Precision Instrument Co., Santa Clara, Calif.

[22] Filed: Oct. 7, 1974

[21] Appl. No.: 512,782

[52] U.S. Cl. .................. 346/76 L; 219/121 L; 350/7; 346/108; 358/297; 358/285

[51] Int. Cl.² ........................... G01D 15/14

[58] Field of Search .............. 346/76 L, 108, 1; 350/6, 7, 8, 175 TS, 230–232; 354/4; 178/7.6; 219/121 L

[56] References Cited

UNITED STATES PATENTS

| | | | |
|---|---|---|---|
| 3,182,574 | 5/1965 | Fleisher et al. | 354/11 |
| 3,314,073 | 4/1967 | Becker | 346/76 L |
| 3,447,853 | 6/1969 | Barkow et al. | 350/7 |
| 3,450,455 | 6/1969 | Landre | 350/7 |
| 3,465,352 | 9/1969 | Carlson et al. | 346/76 L |
| 3,474,457 | 10/1969 | Becker | 346/76 L |
| 3,665,483 | 5/1972 | Becker et al. | 346/76 L X |
| 3,720,784 | 3/1973 | Maydan et al. | 346/76 L X |
| 3,720,785 | 3/1973 | Van Auken | 346/76 L X |
| 3,773,404 | 10/1973 | Moore | 219/121 L X |
| 3,797,908 | 3/1974 | Ward et al. | 350/7 |

*Primary Examiner*—Joseph W. Hartary
*Attorney, Agent, or Firm*—Townsend and Townsend

[57] ABSTRACT

A non-photographic, digital laser image recording and reading method and apparatus for recording and reading visual, two-dimensional replicas or representations of objects, pictures, illustrations, computer outputs and the like. A flat-field twin objective is employed to project the image of a laser beam focused to a diffraction limited spot on a radiation sensitive material, e.g., a heat ablatable or vaporizable recording medium to create a two-dimensional ensemble of holes in the recording medium. The recording medium comprises thin metallic films carried on flat substrates which are moving at constant speed or are immovably held while the image of the diffraction limited spot is scanned thereover by angularly deflecting the laser beam entering the twin objective. The visual laser record is an instantaneous replica of an original image or its computer processed binary equivalent.

4 Claims, 7 Drawing Figures

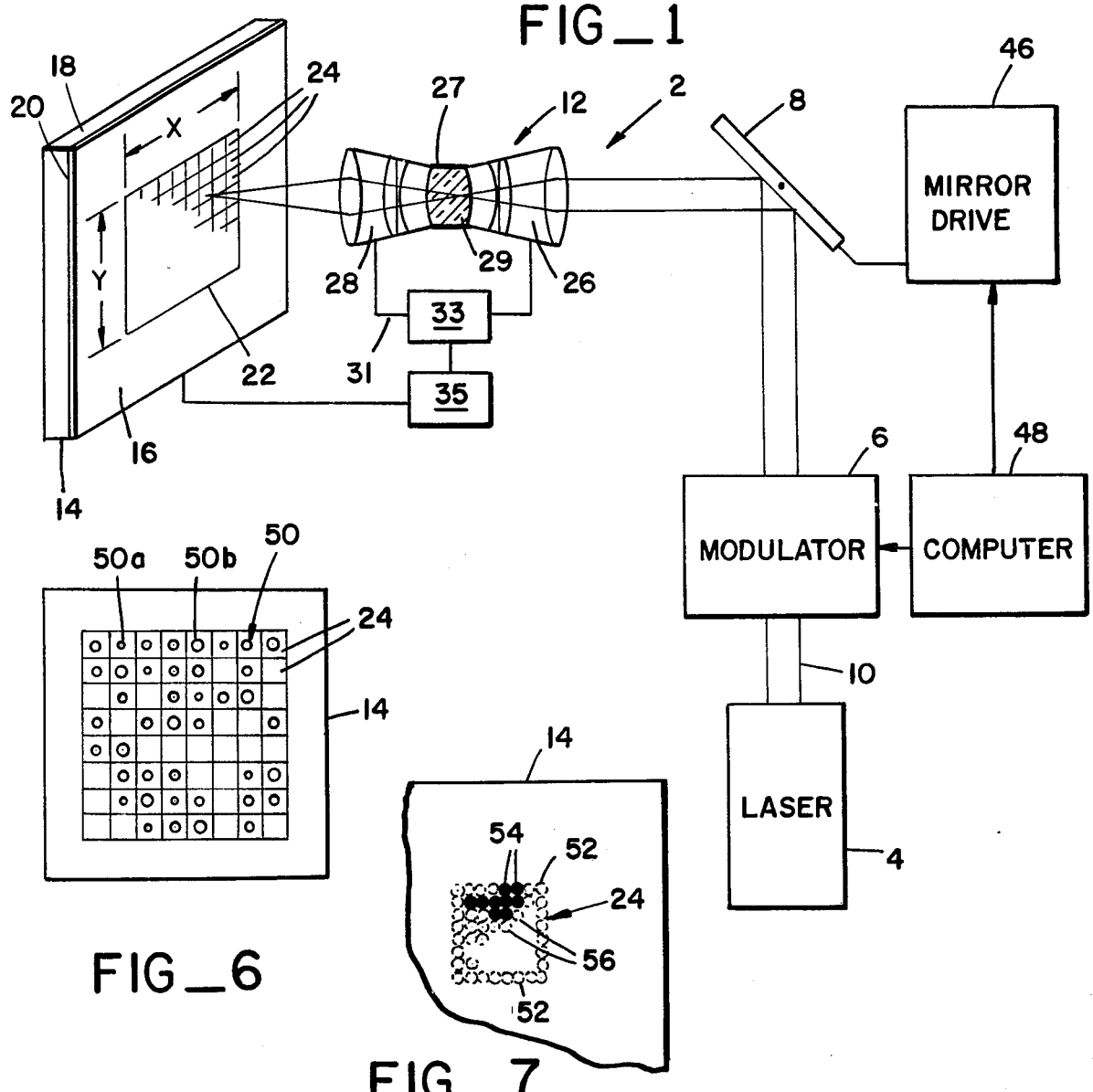
FIG_1
FIG_6
FIG_7
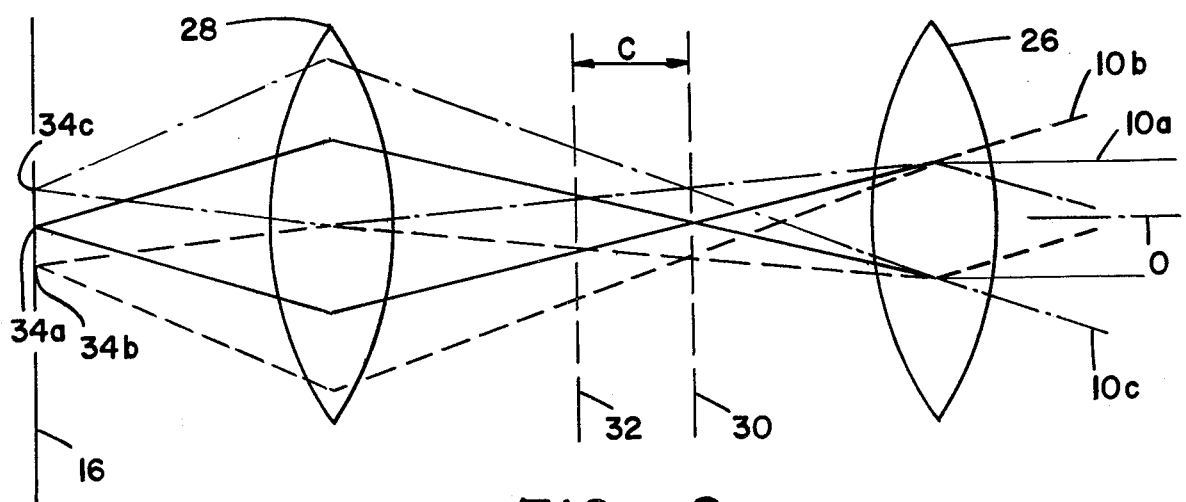
FIG_2

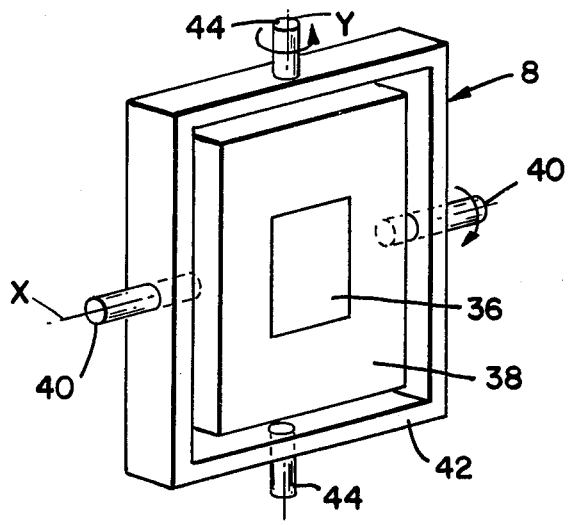
FIG_3
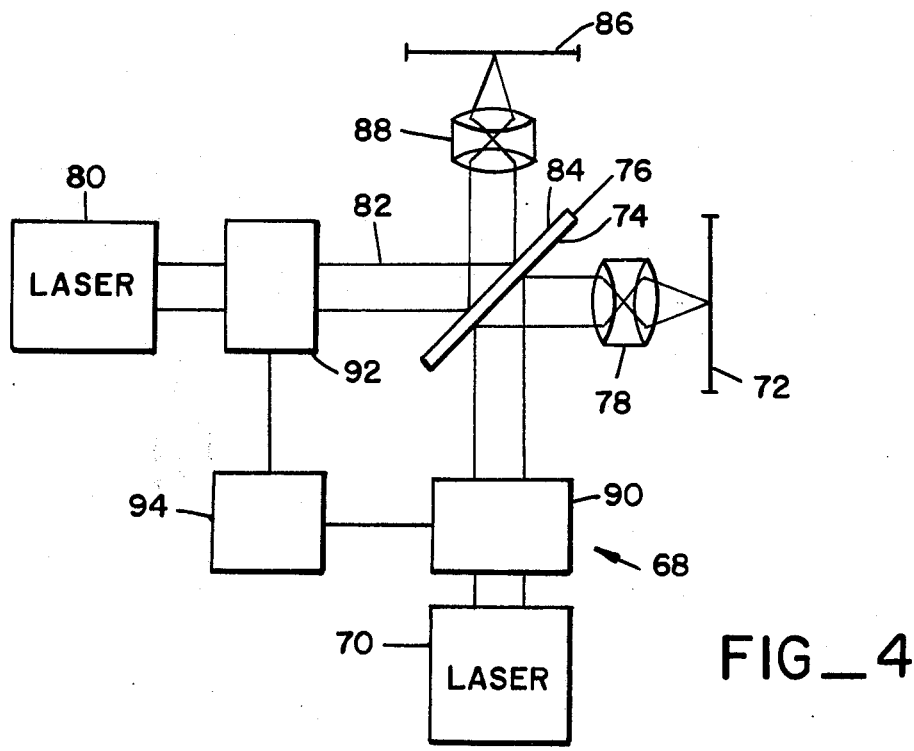
FIG_4
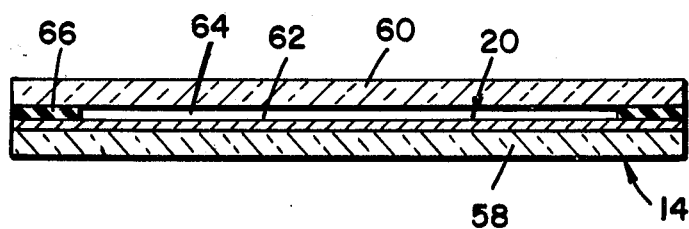
FIG_5

NON-PHOTOGRAPHIC, DIGITAL LASER IMAGE RECORDING

BACKGROUND OF THE INVENTION

Non-photographic digital Laser Image Recording of the present invention employs technologies set forth in U.S. Pat. Nos. 3,314,073 and 3,474,547 by Becker. The first of these patents discloses and claims a system of high density or megacycle frequency recording of information, comprising the production of instantaneous laser recording with a diffraction limited focused laser beam impinging on a thermally vaporizable film coating, so that the coating is removed with thermo-optical energy concentrated within its smallest possible diffraction limited diameter (d), defined as:

$$d = 1.22 \, \lambda \, f/D$$

where 1.22 is a first order Bessel function, ($\lambda$) is the recording laser wavelength, and $f/D$ is the f-number of the laser focusing optics, defined as the ratio of focal length (f) and the effective aperture (D) of the system. The second patent discloses and claims a laser recording medium formed of a substrate having a high optical transmissivity and a metal coating integrally formed on said substrate, a laser generating a laser beam of a predetermined wavelength, and optical means for focusing the laser beam on the recording medium.

Prior art real time recording systems and methods were practically unavailable for recording visual images, that is, images decipherable by the human eye. However, the real time recording of binary mass memories is well known. The above referenced U.S. patents relate to the real time recording of optical mass memories defined by diffraction limited holes or spots in suitable recording media. Real time magnetic recordation of binary data on magnetic tapes, discs, and cards is equally well known and widely practiced. Both systems, however, generate records which cannot be read by the human eye, in other words, the stored data is not in visual form.

Visual recordation, other than contact printing, was primarily limited to photographic recordation. Photographic recordation, of course, is not real time recordation but requires developing times and is, therefore, relatively slow. Moverover, photographic recordation has a relatively low resolution and is frequently ill adapted for many of the high resolution, high speed requirements of present day technology.

In the more recent past, the assignee of the present application developed a printing system based on a non-photographic data recording process which also utilizes the above described metal thin film in conjunction with a laser to create limited holes in the thin film. The resulting two-dimensional ensemble of such holes in the thin film represents a directly viewable replica of the original image.

Such a laser printer comprises a reading section that cooperates with part of a double drum rotating system. One of the drums holds the picture to be printed. The picture is scanned with a reading laser beam by employing a reading objective mounted to a linear transport that is phase locked to the drum rotating mechanism.

The other drum mounts the metal thin film on which the original picture is reproduced, normally at a reduced size, with the printing laser. The beam from the printing laser is externally modulated and projecting through an objective capable of diffraction limited focusing of the beam. The focused beam impinges on the metal film and burns holes therein of minimal size. The printing objective is mounted on a linear translator, the mechanical motion of which is controlled by a phase locked servo mechanism. As the drum rotates at speeds up to 3,000 rpm the printing objective is linearly translated perpendicular to the direction of drum rotation at the required rate to obtain the desired picture resolution.

Thus, this recently developed laser printer enables the high resolution real time printing of data in visual form. However, its printing speed is limited by the rotating speed of the drum which for practical purposes, cannot be much higher than 3,000 rpm. Moreover, the registration of the film and the objective is a mechanical registration which is subject to inherent limitations in its accuracy and, where the highest precision is required, is further very expensive to produce, operate and maintain in satisfactory working order. Thus, the prior art is devoid of an economically producable and operable high speed real time visual image reading and recording system.

SUMMARY OF THE INVENTION

The present invention makes it possible to generate real time visual images of the highest resolution by employing the above described laser printing principles using metal thin-films and the like on which diffraction limited holes are formed in a two-dimensional array. This is accomplished by scanning the focuses beam over the film without the need for precision mechanical components to effect relative movements between the recording laser beam and the thin film recording medium.

In a broad sense, the present invention accomplishes this by employing a twin-objective flat-field laser image scanning system. This system first deflects and focuses the laser beam within diffraction limits in the flat back focal plane of the first objective. An identical but oppositely oriented second objective images the laser focus in a flat image plane of the second objective and the metallic thin film is positioned so that its flat surface coincides with the image plane.

Both objectives (hereinafter sometimes referred to as "lenses") employed in the twin objective of the present invention are flat-field lenses, that is, lenses in which the focal point of coherent light beam is focused in a flat focal plane irrespective of the relative angular inclination of the beam with respect to the optical axis of the lens. Such angular deflections of the beam, however, result in corresponding linear displacements of the focused beam in the flat focal plane of the lens. The second, oppositely oriented lens forms an image of the focused laser beam in the image plane. The image plane is at a finite distance from the second lens if the latter is spaced from the first lens so that their respective front and back focal planes are separated. The linear, or two-dimensional X, Y displacements of the focused laser beam result in corresponding linear or X, Y displacements of its image in the image plane, or on the surface of the metal thin-film. Thus, the present invention enables one to scan the focused laser beam in X, Y directions over the metal thin-film without moving either the film or the objective by merely changing the angular inclination of the incoming beam. This is, for example, conveniently accomplished with an X, Y pivotable mirror which can be scanned at rates which are a multiple of the scanning speed of 3,000 rpm attainable with prior art systems. Thus, scanning speeds on the order of about 15,700 scans per second as are common in video systems, are readily attainable. It is clear, therefore, that this greatly increases the speed with which a recording can be made. At the same time, the expensive mechanical components, drives and guides of prior art systems are eliminated.

The principles of non-photographic, digital laser image recording of the present invention (hereinafter sometimes rs to as "image recording") may be generally characterized as the laser induced conversion of an original image, or its computer processed binary equivalent, to a two-dimensional ensemble of "holes" in a metal thin film, encompassing an instantaneous replica of the original image. A given image to be recorded may be transmitted from a satellite or it may be a document to be stored permanently. It also may comprise the output of computer typesetting or facsimile process, or an electronic picture in a video camera.

The conversion process of the original image to its instantaneous replica on a metal thin-film first utilizes an appropriate modulation of the recording laser beam, for example, in the form of pulse-code-modulation (PCM), pulse-duration-modulation (PDM), frequency-code-modulation (FCM), or frequency-burst-modulation (FBM).

In the image conversion process the matrix of picture elements (pixels) of the original image are transferred to an identical matrix on the metal thin-film while the grey values of the original picture elements are incorporated on the transferred elements. Thus, for example, the image conversion process may incorporate binary states, confining the picture elements to a $2^k$ bit grey scale.

Flat-field, twin-objective laser image scanning can be practiced in three principle forms: serial, parallel or character scanning. Serial scanning requires a single recording (and/or reading) laser beam. Parallel laser scanning utilizes as many separately modulated recording (and/or reading) beams as there are channels to be recorded, for example, 7 or 9 channels for a 7- or 9- channel computer output. Character laser scanning utilizes high intensity laser beams which directly image readable characters, for example from an optical disc, on the metal thin film.

The laser image recording is equally applicable to a corresponding reading process because the latter employs the same concept as the recording process. For example, a flat-field laser image recording system may be combined with an identical flat-field laser image reading system. Both systems are preferably connected through a common mirror scanner, one mirror surface of which is deflecting the reading laser beam, while the other mirror surface deflects the recording laser beam.

Image recording employs a linear density grey scale. Such a grey scale for example is found in images transmitted from a satellite. A linear grey scale surface is quite different from the conventional logarithmic density scales in a photographic system; in the linear system each grey value or level occurs in equal increments or size density steps, from zero to a maximum density (D max.). In order to provide such a linear density grey scale in conjunction with non-photographic, digital laser image recording, the transfer function electronics between the original image to be recorded and its recording on metal thin-film have to be such that the linear binary grey scale of $2^k$ shades, resulting from an original image, is converted to an inverse function which is then applied to the electro-optical laser beam modulation characteristic to obtain a linear density grey scale. The reason for this specification transfer function is the logarithmic relationship between the density (D) and the transmissivity (T) of the optical transparency created in the metal thin-film by the recording laser beam:

$$D = \log (1/T)$$

The important advantages of a non-photographic, digital laser image recording system using a linear density grey scale are the elimination of photographic negatives and positives, as well as their associated non-linearities the elimination of photographic grain and emulsion, together with their related Rayleigh scattering and their non-linear gammma and photographic frequency response.

The square matrix of the picture element or pixel ensemble is "position-invarient" in regard to the original image. In contrast to conventional photography, each matrix element (pixel) comprises a true binary grey level, independent of the rest of the picture. In addition, the created grey scale can be quantitatively modified without changing the matrix and geometry of the image. Such modifications are characterized as "quantization," "intensification," "attenuation," and "gamma-correction." Of course, all modifications of the grey scale are originated within the computer data process preceding the actual laser image recording.

Further, the laser image structure is determined in its "entirety," i.e., its diffraction-limited elements are invariant and equally separated by the Rayleigh pattern of optimum resolution. Hence, the diffraction limited separation of two pixels determines the grid-spacing of the essentially square image matrix as an invariant quantity.

On this basis, the most important parameter of non-photographic digital laser image recording involves the optical diffraction limits of the systems. Quite different from photographic processes, which are adversely affected by photo-chemistry, photographic diffusion, solarization, and gamma distortion— the diffraction limits of non-photographic digital laser image recording systems determine their entire operational characteristics. This applies particularly to the optical resolution and grey scales of the system, as well as to error rates and signal-to-noise ratios.

The recording medium employed by the present invention is a special metal thin-film which is RF-vacuum sputtered upon an optically flat transparent substrate. U.S. Pat. No. 3,649,502 describes of such media and their manufacture in greater detail. For maximum recording sensitivity, tin and indium are selected as the recording media and they are vacuum coated upon the substrate with a very thin layer of Rhodium to prevent the degradation of the medium with time. The metal thin-film is covered with a protective transparent film or a glass plate and the space between the film and the cover plate is vacuumized. The vacuum encapsulation of the metallic thin-film assures an error-free recording medium because the space surrounding the film is dust-free. Any dust particle that might be deposited on the exterior surface of the cover are out of focus and therefore, undetectable by the recording or reading laser beam. Specific considerations for selecting thin-film materials is the result of certain thermodynamics considerations which are set forth in U.S. Pat. No. 3,474,457.

An important aspect of the image recording system of the present invention is its diffraction limited, twin objective, flat-field, laser focusing objective. It achieves a flat-field two-dimensional scan of maximum area size and further provides a symmetrical imaging system that is inherently free from optical distortion. Although this is strictly true only for the case of unit magnification, where the optical elements behind the central aperture stop must be mirror images of those ahead of the stop, for practical purposes and especially for the present invention optical distortions due to other than unit magnification are so slight as to be negligible since they do not adversely affect the quality of the finished record.

During the middle of the last century, the symmetry principle of photographic optical imaging and magnification was independently discovered in Europe by C. A. Steinheil and J. H. Dallmeyer. Quite different from this known principle of symmetrical 1:1 imaging, this invention segragates the functions of the twin objectives into a flat-field laser focusing by the first objective and a flat-field imaging of the field of laser focus upon the metallic thin film by the second objective for recordation on the film. The operational parameters of such a system are based on the following physics' considerations:

The diffraction limited resolution of an optical imaging system with circular aperture (D) is determined by its Fraunhofer diffraction pattern. This pattern is characterized by the Rayleigh-Sommerfeld formulation of diffraction, yielding the optical resolution $(d)^{-1}$ of such a system to be defined by:

$$d = 1.22 \, \lambda f \text{No.}$$

where ($d$) is the Rayleigh separation of two focused circular diffraction patterns, 1.22 is the first zero order Bessel function, ($\lambda$) is the laser wavelength, and ($f$ No.) is the f-number of the focusing system, defined as the ratio of focal length ($f$) divided by the effective aperture ($D$). The f-number is also related to the numerical aperture ($N.A$) of the system, according to the following definition:

$$f = ( 1/2 \times N.A. )$$

Applied to twin-objective laser image scanning optics, theoretically any desired resolution and flat-field image size may be achieved as long as the corresponding $f$-number and focal length of the system are obtained. With an increasing focal length, it becomes increasingly more difficult to achieve the required f-number and resolution even when resorting to computer lens designs.

However, an increase in resolution beyond the Rayleigh diffraction limits is nevertheless possible by means of "apodization", i.e., by severing the foot of the Rayleigh diffraction pattern. The physical meaning of such a procedure comprises the "hole burning" threshold of laser recording on a metal thin film, in effect comprises reducing the laser power and/or the pulse duration so that the resulting burned hole has a lesser size than its diffraction limit since the total available laser energy is insufficient to burn a hole of a diffraction limited size. This procedure permits a reduction of the diffraction limited hole size by as much as 50%. Assuming, for example, that the diffraction limited hole size is 1 micrometer, it is feasible to produce 0.5 micrometer holes with the same optics, strictly by means of limiting the laser printing power and exposure time.

The highest resolution of the twin objective laser image recording system is achieved by giving the space between the two individual lenses, the same index of refraction as that of the lenses. Conventionally this can be done by filling the space with an appropriate immersion oil. It can also be accomplished by filling the space with glass, for example, as be designing the twin objective system into a unit in which the lenses are joined by an integral length of glass. In applications in which relatively large amounts of heat are generated the latter alternative is preferred over the use of immersion oils.

The increase in the effective numerical aperture of the twin objective that is obtained thereby is proportional to the ratio of the index of refraction of the oil or glass ($n = 1.5$) between the lenses to that of air ($n = 1$). The effective numerical aperture of the twin objective can thus be increased by a factor of about 1.5 or about 50 percent.

The flat-field laser image recording system of the present invention thus represents a great improvement over the prior art because the heretofore necessary complicated mechanical scanning mechanisms are eliminated. This not only lessens the cost of the system but further enables its operation at much higher scanning speeds. The laser image is two-dimensionally scanned over the desired flat surface area of the recording medium.

The scanned recording medium surface area can be changed by adjustably mounting two lenses of the twin objective so that their relative spacing can be increased or decreased (while at all times maintaining a distance C between the adjoining back and front focal planes of the lenses to obtain a finitely spaced image plane as described hereinafter) to correspondingly decrease or increase the scanned area. Such adjustment of the scanned area size carries with it a corresponding increase or decrease of the image size of the diffraction limited laser spot focused by the first lens of the twin objective, and requires the focusing of the image, preferably by providing an automatic focusing system which is phase-locked to the twin objective and which automatically places the recording medium surface in the image plane of the imaging lens.

The laser image recording system can advantageously advantageoulsy utilized in diverse applications and fields of technology. It can be employed as for making and/or reading flat-field laser mass memories or for computer data storage purposes and eliminates the heretofore necessary rotating drums and turntables as well as the correspondingly shaped data strips and discs. Accordingly, memories can be scanned at any speed attainable with pivoting mirrors or spinners and the scanning speed is no longer limited by the relatively low number of revolutions per second of a physically rotated or spun information carrier. The retrieval of laser recorded information and proper accessing is not limited to mechanical registration means, the phase-locking of independently driven mechanical components and the like. Instead, the present invention enables the use of self-orienting laser reading beams which employ such conventional techniques as phase-locked servo mechanisms to properly position the film. Flat-field laser mass memories and computer data storage utilizing the above described metal thin films have suitable formats as, for example, metal coated fiches, microfiches, ultra-microfiches and the like.

In another application, the image recording system enables the instantaneous formation of a visual recording from a video signal or a television screen for instantaneous playback. In such an application the twin-objective laser image scanning system may, for example, sweep the lines of the video picture transversely across a metal thin-film of appropriate format (such as super eight millimeter, 16 millimeter. 35 millimeter or 70 millimeter film) and thereby record a visual image of the video picture. During the scanning process, the metal thin-film moves across the scanned lines at a constant speed maintained by means of a phase locked servo control (in which case the mirror line-scans the laser beam in one, e.g., the X direction only) or the film is maintained stationary and the laser beam is two-dimensionally scanned across a given frame of the metal thin film. Thus, laser video recording based upon this invention, takes place with instantaneous reproduceability. In comparison to conventional photographic video recording techniques, there is no need for a photographic medium or for photo-processing which greatly simplifies the video recording system while, at the same time, the present invention enchances the fidelity and resolution of the recording.

Another outstanding application of the laser image recording system relates to newspaper and facsimile laser printing and transmission. The system of the present invention replaces the heretofore used photographic paste-ups with metal thin films and non-photographic, instantaneous flat-field laser recording. The laser is employed to print newspaper and facsimiles directly on offset lithoplates which are pre-sensitized to the wavelength of the printing laser employed in the system. Also, the present invention can be employed in conjunction with relief printing plates (polymers) by coating the plates with a metallic thin-film which is exposed to the laser beams via the flat-field twin-objective laser image scanning system of the present invention. Areas of the thin-film exposed to the laser image are ablated or vaporized, thereby exposing the underlying portions of the printing plate which are then conventionally removed or washed out.

Computer type setting can be accomplished with the laser recording system by instantaneously laser printing the electronic computer output on a flat field. Furthermore, the output can be simultaneously transmitted for printing at a remote location. An adaptation of this system employs remote multiple beam unit laser printing of transmitted news information (including text graphics) onto offset lithoplates or polymer relief plates which are presensitized to the wavelength of the printing laser or metal coated, respectively.

The laser image recording system of the present invention is further ideally suited for use in computer input and output image processing, not only because of its digital nature and high speed but also because it eliminates the time consuming photographic processes employed in prior art systems.

When applied to computer input microprinting (CIM) metallic thin films on suitable, e.g. mylar substrates are used as recording media as contrasted to the heretofore common photosensitive films. The document or original to be converted to digital form is scanned with a low power focused laser beam, e.g. a HeNe laser to two-dimensionally scan the document in a line sequential serial manner, or by using beam splitters, parallel scanning can be used. The speed of the system is limited only by the limitations of the scanner itself and the output of the scanner can be in computer compatible form. Similarly, in computer output microprinting (COM) applications, the output data from the computer is in a form compatible with the optical modulator control electronics and the image printing time is limited only by the speed of the beam deflector. As in the CIM applications, faster printing speeds can be obtained with COM, by utilizing parallel recording beams, or where high speed is not of utmost importance, serial line printing can be employed.

As an extension of the COM system a particularly advantageous application of the present invention can be found in visually recording computer processing satellite originated pictures. The recordation of such pictures is characterized by a very large volume of up to 200 pictures per day each having $10^8$ bits per frame requiring $2 \times 10^{10}$ bits per day at a speed of more than 10 megabits per second. This vast amount of data requires very high resolution and digital laser recording capabilities neither one of which can be achieved with photographic means.

The other important requirement for satellite image recording systems is characterized as the conversion of the image information transmitted from a satellite into individual square elements and grey scales, corresponding to the original intensity distribution of the transmitted images. The original intensity values extend over 4 bits, 6 bits and 8 bit binary intensity ranges, i.e. from 16 to 64, and 256 linear shades of binary grey values, respectively. This intensity range is to be linearly distributed over any desired density range, for example, excellent results have been obtained using an intensity range linearly distributed over 2.0 density units. In addition, non-linear density distributions are also required, characterized as non-linear transfer functions and non-linear gamma.

The laser image recording system of the present invention is well suited for this application. It creates square picture elements or pixels in the metal thin film made up of holes and "no holes" of equal size within the metal thin film or of holes of differing diameters to obtain the desired grey scale and values.

Another application of the laser image recording system relates to the manufacture of integrated circuits (IC). In the past, IC's were made by coating their surface with a photo-resist material, exposing the photo-resist to light or radiation while masking it, thereafter removing the exposed (or unexposed) photo-resist, and plating the portions of the substrate from which the resist material had been removed. This is a tedious and timeconsuming process, and yields and IC the quality of which is limited by the inherent limitations in the resolution that can be obtainable as the photo-resist emulsions.

By employing the present invention, IC's are made by simply applying a metal thin film to the semi-conductor substrate and thereafter flat-field scanning the imaged laser beam thereover to ablate or remove portions of the film. The laser beam is continuous for the removal or ablation of continuous lengths of the metal film rather than the ablation of distruct holes as above described. Thus, the present invention greatly facilitates the easy and economy with which IC's can be produced, since it eliminates the heretofore necessary multiple process steps while it provides for a much better resolution and, therefore, higher quality IC. Alternatively, the image recording system can be used for making high resolution masks which in turn are used for conventionally producing an IC.

BRIEF DESCRIPTION OF THE DRAWINGS

FIG. 1 is a schematic view of a flat-field non-photographic laser image recording system constructed in accordance with the present invention;

FIG. 2 is a schematic representation of the flat-field twin objective laser image recording optics of the present invention;

FIG. 3 is a perspective view of an X-Y deflectable mirror constructed in accordance with the present invention;

FIG. 4 is a schematic view of a laser image reading-recording system constructed in accordance with the present invention;

FIG. 5 is an enlarged cross-sectional view through a metal thin film recording unit constructed in accordance with the present invention;

FIG. 6 is a schematic representation of image plane and illustrates how grey values are recorded by changing the hole diameter in each element; and FIG. 7 is a view similar to FIG. 6 and illustrates a method of obtaining grey values by dividing each picture element into a plurality of sub-elements each of which includes a hole or no hole recorded therein.

DESCRIPTION OF THE PREFERRED EMBODIMENTS

Referring first to FIGS. 1 and 2, the present invention broadly provides a recording system in which visual images are recorded on or read from a suitable recording medium. For the purposes of this specification and the claims the term "visual image" means images which can be discerned by the human eye. Thus, the image may comprise a picture, letters, design or any other recorded visual information. It may also comprise a record of information which is not ordinarily understood or discernible by the human eye, such as a record of data in binary form. Accordingly, the term "visual image", or terms of similar import denote the ability of the record of the present invention to hold visually discernible information, as, for example, contrasted with the corresponding inability of a magnetic disc to hold visually discernible information. Nevertheless, if desired one may record information in accordance with the present invention in a form which is not discernible by the human eye.

This specification and the attendant claims also use the term "flat-field", "flat-field lens", "flat-field objective", etc. The term flat-field, or terms of similar import, is intended to and does mean the ability of an optical component, such as a lens or an objective, of focusing or imaging a radiation beam, such as a light beam, in a plane irrespective of the relative angular inclination relative to the optical axis of the "incoming beam" as it enters the lens. Thus, the term excludes optical systems such as lenses or objectives in which the focal point of an incoming beam falls on a curved surface if the incoming beam is angularly offset relative to the optical axis.

The non-photographic flat-field laser image recording system of the present invention is generally identified with the reference numeral 2 and includes a source of a collimated, coherent radiation beam such as a laser 4, a modulator 6 and a mirror scanner 8. The scanner may be a mirror or other suitable reflector such as prism, or a multi-faced rotating spinner and is pivotable with respect to the laser beam 10 about at least one axis and normally about perpendicular X and Y axes. The mirror is positioned to intercept the laser beam modulated by the modulator and directs the beam through a twin objective 12 onto a recording unit 14, the free surface of which coincides with a flat image or recording plane 16 of the twin objective. During recording, the recording unit and the twin objective are fixed and immovable with respect to each other. For maximum angular deflections of the laser beam with respect to the optical axis of objective 12 the mirror is positioned as closely as possible to the objective.

The recording unit comprises a substrate 18 such as a glass plate or a mylar film and carries a thin layer 20 of a recording medium. The recording medium itself is made of a radiation sensitive material preferably it comprises a heat ablatable metal thin film as, for example, described in the above referenced U.S. Pat. No. 3,649,502. Images may be recorded for example, in the square two-dimensional recording area 22. The recordation of a given picture is accomplished by dividing the recording area into a rectilinear matrix defining picture elements 24 carrying one or more digital recorded focused laser beam images. In the above referenced preferred embodiment of the invention employing heat ablatable metal thin films the recorded images are defined by holes burnt into the film. After the recordation is completed the recording area is defined by a two-dimensional ensemble of holes of different sizes or of holes and no holes, to form a visual representation of an object, picture, design, character and the like.

Each picture element 24 may be defined by a single burnt hole the size of which determines the grey value of the element on the grey scale employed in the picture. Alternatively, each picture element may be defined by a plurality of recorded or unrecorded focused laser beam images, that is by a plurality of holes or no holes to determine the grey value of the element.

To effect the recordation of the focused laser beam images in recording area 22, the image is two-dimensionally scanned in both the X direction and the Y direction over the extent of the recording area to form the two-dimensional hole ensemble. The holes are recorded by deflecting the modulated laser beam 10 in X and Y directions. The deflection is obtained from scanner 8 by correspondingly pivoting it in one or the other, or both directions. Such pivotal motions of the mirror cause corresponding angular inclinations of the incoming laser beam relative to the optical axis of twin objective 12. FIG. 2 illustrates three possible laser beam positions. In one position the laser beam 10a is parallel to the optical axis. In the other illustrated positions the laser beam is identified with reference numerals 10b and 10c, respectively, and is inclined to one and the other side of the optical axis.

The twin objective of the present invention is defined by two identical flat-field objectives or lenses 26 and 28. Flat-field lenses are commercially available. One well suited flat-field lens is sold by the Karl Zeiss Company of Oberkochen, Germany, is designated LD-EPI-PLAN and bears the Zeiss Catalog Number 462104. This lens is a high quality lens capable of focusing the laser beam to its diffraction limits, that is into a spot which has a cross-section of the order of the wavelength of the laser beam as above discussed.

This lens is a 40× lens and has a 0.60 N.A., a focal length of 4.1 millimeters and a working distance of 3.4 millimeters. Other objectives can, of course, be substituted as long as they have a flat-field characteristic so that the incoming laser beam is focused in a flat focal plane 30 of the lens irrespective of the angular inclination of the incoming beam with respect to the optical axis. FIG. 2 schematically illustrates the lateral, linear displacement of the focal points of the beam in response to angular beam deflections.

The second lens 28 of the twin objective is spaced from the first objective so that its front focal plane 32 is spaced a distance C from back focal plane 30 of the first lens. Since the second lens is identical to the first lens it forms an image 34 of the focused laser beam at a finite distance from the lens, that is in image plane 16. If the laser beam focus is laterally displaced, due to an angular inclination of the incoming beam, a corresponding lateral displacement of the focused beam image in the image plane takes place. Since the second lens is also a flat field lens the lateral displacement of the image is in a plane, not a curved surface. Accordingly, recording area 22 can be scanned with the focused laser beam image correspondingly deflecting the incoming laser beam in X-Y directions.

It should be observed that by increasing or decreasing the spacing between lenses 26 and 28 to correspondingly increase or decrease the distance C between the respective back and front focal planes 30 and 32 the distance between the lens 28 and the image plane 16 is correspondingly decreased or increased. This then results in a corresponding decrease or increase in the relative lateral displacement of the focused laser beam image 34 for a given angular deflection of the incoming beam. It further results in a corresponding decrease or increase in the cross-section of the projected image 34. Thus, the readout obtained by twin objective of the present invention can thereby be varied to yield, for example a full size replica, a microprint or an ultra-microprint of a given picture to be reproduced. To maintain image 34 focused on the recording medium, an automatic focusing mechanism 35 is provided which is phase-locked to the lens spacing means 33 for moving the recording unit 14 towards or away from the lens in accordance with decreases or increases in the spacing C.

Objective 12 may include a tube 27 between lenses 26 and 28 which is concentric with the optical path through the objective and which is hermetically sealed thereto and holds an immersion oil having an index of refraction equal, or substantially equal to the index refraction of the lenses. Alternatively, the space between the lenses may be filled with a length of glass 29 (in which case no outer tube 27 is necessary) which, for example, may be integrally constructed with the last and first elements of lenses 26 and 28, respectively, so that the index of refraction of the objective is constant over its full length.

When the spacing between lenses 26 and 28 is adjustable they are separately mounted on a suitable holder 31 and means 33 is provided, such as a sliding track arrangement along which the lenses may be moved in optical alignment with respect to each other. Such adjustment is, of course, not possible in instances in which glass 29 interconnects the two lenses. When the lens spacing is adjustable outer tube 27 may, for example, comprise a telescoping, sealed tube arrangement and be provided with a suitable reservoir of immersion fluid (not shown in the drawings) to take up excess or to supply additional immersion fluid when the lenses are drawn together or moved apart, respectively.

For theoretical discussions on flat-field optics reference is made to Optical Data Processing by Arnold R. Shulman, John Wiley, Inc. 1970, particularly pages 158 and 159. Reference is also made to Optical Instruments and Techniques edited by J. Home Dickson, Oriel Press, 1970, particularly page 421 for a general background on twin objectives and their characteristics.

Referring now briefly to FIG. 3, scanning of the incoming beam, that is its angular deflection is effected by scanning mirror 8. Mirror 8 comprises a reflector 36 mounted on a gimbal 38 which has a line shaft 40 journaled in an outer frame 42 so that the mirror can be pivoted about the X axis defined by the shaft. The outer frame includes perpendicularly arranged shafts 44 for pivoting the outer frame and thereby, gimbal 38 and reflector 36 about the Y axis. Suitably constructed drive means 46 for the mirror to pivot or scan it in the X and Y directions is provided. The detailed construction of the drive means is well within the view of those skilled in the art and is therefore not further described herein.

Referring again to FIGS. 1 and 2, the overall operation of the laser image recording system 2 should now be clear. Laser 4 is energized to emit laser beam 10 and modulator 6, which may be separate or integral with laser 4, modulates the energy density and/or the pulse duration of the laser beam directed to scanner 8. The modulator is controlled by input signals derived from a computer 48. The computer in turn phase-locks a mirror drive 46 with modulator 6 so that each laser beam pulse is directed to the proper picture element 24 in the recording area 22 of recording unit 14.

As was described above, the computer output may represent data to be recorded on a laser mass memory defined by recording unit 14. Normally the data will be recorded in binary form and the computer will correspondingly control the modulator 6. In another application the output of computer 48 may comprise video signals, e.g., television signals, which may further be independently used to generate a picture on a television screen (not shown in the drawings); the output signals are again used by modulator 6 to modulate laser beam 10 so that it records visible images of the video signals on recording unit 14. In such an application the recording unit comprises a long length of film which is continueously or intermittently advanced to record thereon conventional visual image frames which can then be played in conventional motion picture projectors. The resulting film, though not a color film, can also be employed to later generate color television pictures by recording three separate color channel images on the film side by side, for example.

In yet another application, already discussed above, the computer output may comprise material to be printed in a newspaper, for example, which is to be typeset on an offset or a relief printing plate. The computer output controls modulator 6, so that the laser beam 10 records on the recording unit 14 letters, pictures, graphic representations, etc. for printing onto newsprint after the printing plate has been suitably treated. In a still further application the computer output may comprise the computer processed data transmitted from a satellite for forming satellite pictures of the earth or its cloud cover, for example.

In all applications the modulated laser beam 10 is laterally (in the X and Y directions) scanned over recording area 22 of recording unit 14 by scanner 8. The diffraction limited focused laser beam is imaged on the recording unit and there burns or ablate holes 50 as illustrated in FIG. 6. The grey value of each picture element can be determined by increasing or decreasing the size of the burnt hole. This is accomplished by correspondingly adjusting the energy level in laser beam 10 and/or the duration of a laser pulse for forming the hole. Thus, picture elements having larger or smaller holes 50a and 50b represent correspondingly darker or lighter pictures areas with the appropriate grey value.

In another application computer 48 may control modulator 6 so that each picture element 24 is defined by a plurality of sub-elements 52 (for example 64 sub-elements per picture element) as illustrated in FIG. 7 defined by a like number of holes 54 and no holes 56 to thereby define the grey value of the picture element. As is apparent in the example illustrated in FIG. 7 the picture has a $2^6$ or 64 value grey scale.

Referring now briefly to FIG. 5, it is preferred that each recording unit 14 be a self-contained unit defined by a preferably rigid substrate 58 such as a glass plate which carries the thin layer of heat ablatable material or recording medium 20. A rigid cover 60, such as a transparent glass plate is spaced from a free side 62 of a recording medium to define an interior space 64 which is vacuumized and sealed with a suitable gasket 66. By vacuumizing the interior space the recording unit 14 can be preassembled in dust-free surroundings to prevent the danger of depositing dust or other foreign particles on the surface of the recording medium. The presence of such dust particles would prevent the proper recordation of diffraction limited images on the heat ablatable recording medium and would therefore result in recording errors. The presence of dust or foreign particles on the exterior surfaces of cover 60 does not adversely affect the recordation of the diffraction limited images because such dust particles are out of focus, that is, they are spaced from the recording surface 62 of the recording medium.

Referring now to FIG. 4, in another embodiment of the present invention the recording system illustrated in FIG. 1 in some detail is combined with a read system with both functioning simultaneously for an instantaneous reading-recording system 68. The reading system of the unit comprises a first laser such as a red helium-neon laser 70 which scans a document 72 to be reproduced via a first side 74 of an X-Y scanner 76 constructed as abovedescribed and a flat-field twin objective 78. A second recording laser 80 such as an Argon II ionic laser directs its beam 82 to the other side 84 of scanner 76 and hence onto the image plane of a recording medium 86 via a flat-field objective 88. An optical detector 90 senses the reflections from document 72 and suitably modulates laser beam 82 with a modulator 92 via suitable electronics 94. The operation of the read/record unit is as above described to effect the simultaneous recording of data read by the read section of the system. Both reading and recording involves the same steps as above described in connection with the description of FIG. 1. The system is therefore not further elaborated on here.

We claim:

1. A real time, flat-field laser recording system employing an ablatable recording medium carried on a flat substrate comprising:

holding means for positioning the recording medium flat in a recording plane;

a diffraction limited twin objective having first and second spaced-apart, aligned lens means for focusing a laser beam in a diffraction limited spot in the focal plane of the first lens means and for projecting a diffraction limited, focused image of the spot in the recording plane irrespective of the relative angular inclination of the incoming beam relative to the twin objective;

means between the lens means of the twin objective filling the optical path between the lens means with a material having an index of refraction substantially equal to the index of refraction of the lens means;

a laser for emitting a laser beam;

means for modulating the laser beam; and mirror means for angularly deflecting the laser beam with respect to the optical axis of the twin objective;

whereby such angular deflection of the laser by the mirror means causes a corresponding angular deflection of the focused image over the recording plane in corresponding X and Y directions while the modulation of the laser beam by the modulating means causes the formation of a two-dimensional ensemble of ablated holes in the recording medium at a line speed equal to the operating speed of the mirror means.

2. A system according to claim 1 wherein the material having said index of refraction comprises an immersion oil.

3. A system according to claim 1 wherein the material having said index of refraction comprises to a solid material.

4. A system according to claim 3 wherein the solid material comprises glass.

* * * * *